Jan. 21, 1964  O. J. SHAVER  3,118,265
FEEDER ATTACHMENT
Filed July 21, 1961  2 Sheets-Sheet 1

INVENTOR.
ODEN J. SHAVER
BY
Braddock and Braddock
ATTORNEYS

Jan. 21, 1964 O. J. SHAVER 3,118,265
FEEDER ATTACHMENT
Filed July 21, 1961 2 Sheets-Sheet 2

INVENTOR.
ODEN J. SHAVER
BY
Braddock and Braddock
ATTORNEYS

United States Patent Office 3,118,265
Patented Jan. 21, 1964

3,118,265
FEEDER ATTACHMENT
Oden J. Shaver, Kenmare, N. Dak.
Filed July 21, 1961, Ser. No. 125,706
3 Claims. (Cl. 56—23)

The present invention has relation to a feeder attachment and more particularly to an attachment that may be used on a machine for cutting standing crops to aid in the feeding of cut material into the machine.

Presently farmers use a great number of machines to cut a standing crop which is then directly processed by the machine after cutting. A typical machine of this type is a field forage harvester or chopper. In order to maximize output the machine has a cutting bar that is elongated as much as possible. Generally, the working element of the machine, such as the chopping cylinder is relatively narrow. Thus, in order to move the cut material into the chopping cylinder it is necessary to compact the material somewhat.

Certain forage harvesters on the market employ a draper or canvas conveyor located substantially in the center of a cutting platform and positioned to convey the cut material upwardly toward the work element of the machine. The draper is considerably narrower than the cutting bar and the conventional machines of this type depend upon the force of gravity acting upon the cut material to move it along downwardly tapered surfaces toward the draper or canvas. It has been found that after green material, such as hay or corn, has been cut it is difficult to make it move under the force of gravity. If the material does not move onto the draper the cutting bar will become plugged and thus will be inoperative.

In order to overcome the difficulties involved in the feeding of material from a relatively wide cutter bar onto a narrow feeding element, such as a canvas or draper conveyor, it has been found necessary to have mechanical means to provide an impetus or force to the cut material to move it in the desired direction.

A device made according to the present invention presents a transverse feeding element next adjacent the cutter bar and lying substantially parallel to and above it. The end portions of the feeding element made according to the present invention have auger sections that are designed to move the cut material toward the draper. The center portion of the feeding attachment is constructed like a flail or beater that has blades which rotate and engage the cut material to bat it upwardly in the direction of travel of the conveyor.

It is an object of the present invention to present a feeding attachment for installation on machines for cutting field crops that insures a smooth, positive feed of the cut material.

Figure 1:
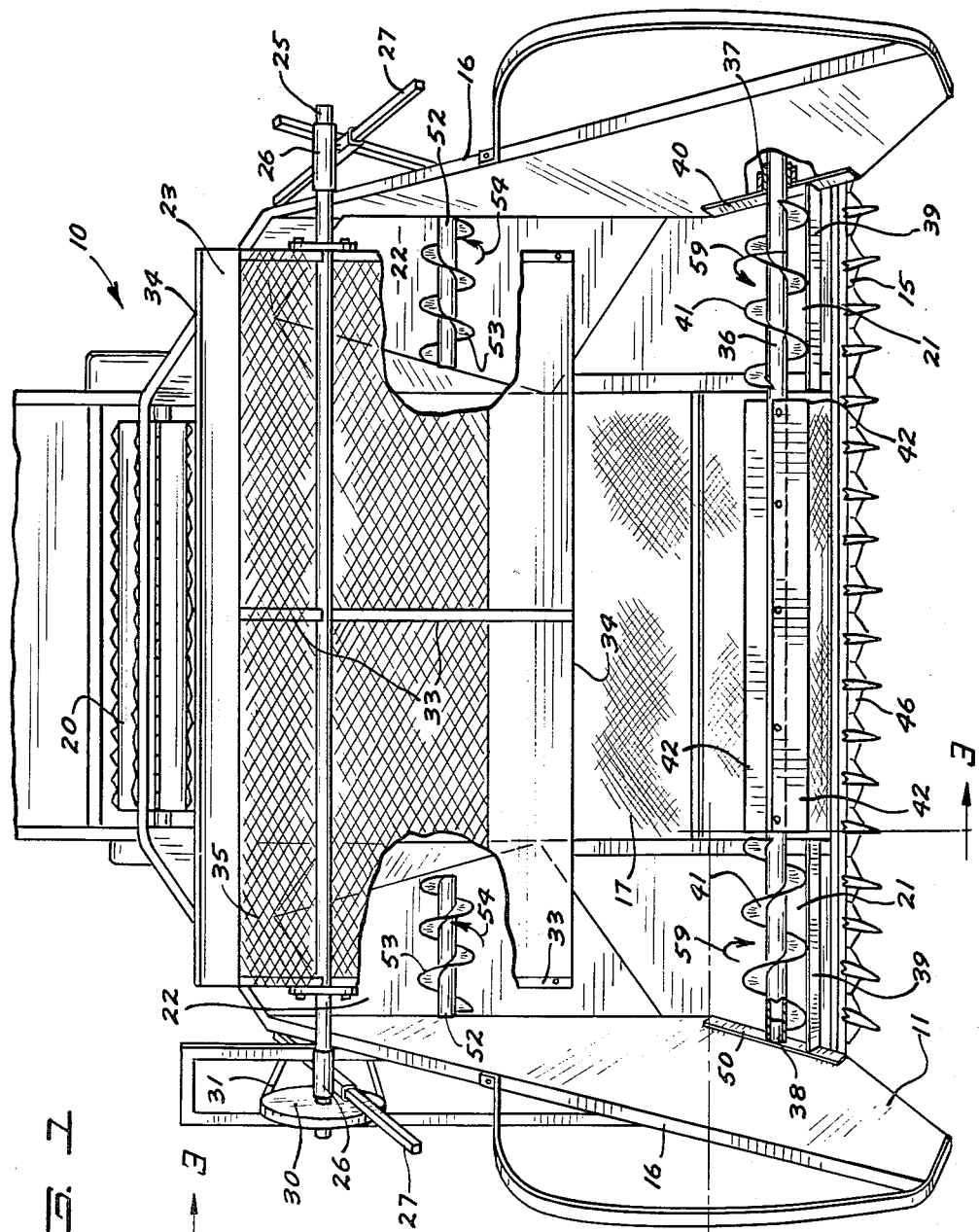
FIG. 1 is a front elevational view of a field forage harvester having a feeder attachment made according to the present invention installed thereon with parts in section and parts broken away.
Figure 2:
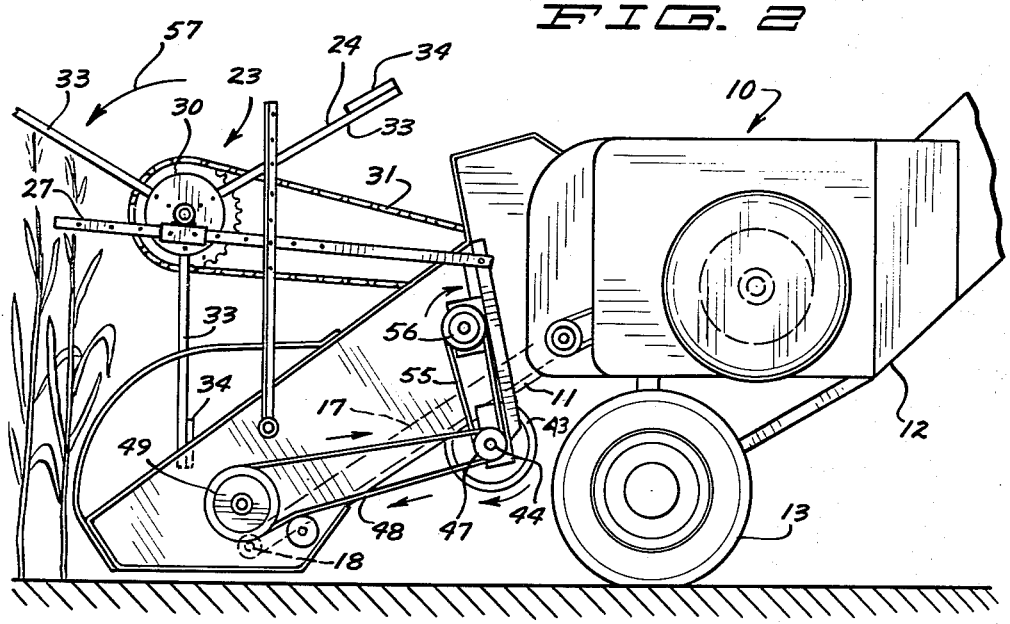
FIG. 2 is a side elevational view of the device of FIG. 1 as viewed from a right side thereof with certain parts removed.
Figure 3:
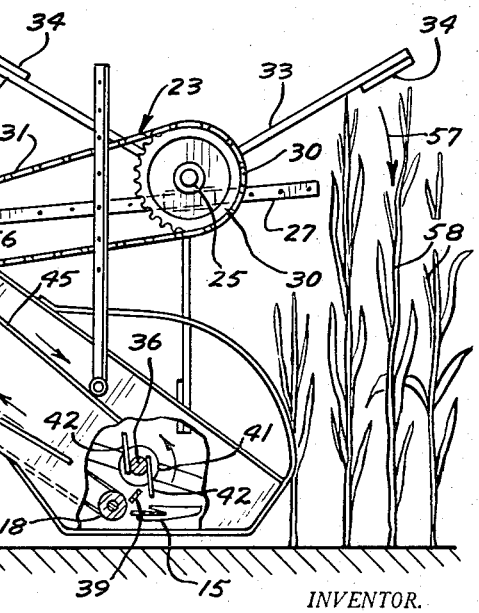
FIG. 3 is a side elevational view of the device of FIG. 1 as viewed from a left side thereof with parts in section and parts broken away and taken as on line 3—3 in FIGURE 1.

Referring to the drawings and the numerals of reference thereon, a field forage harvester or field chopper illustrated generally at 10 includes a header or cutting platform 11 that is attached to a main chopper body 12. The chopper is carried by ground engaging support wheels 13, 13 and may be pulled through the field by a tractor (not shown). The unit is driven through a rotatably mounted main power shaft 14 that in turn is drivably connected to a suitable source of power such as the power take off of a tractor or an independant power unit. The main power shaft 14 is connected through suitable belts or chains to its various driven components.

The header 11 of the field forage harvester 10 has a forwardly disposed sickle type cutter bar 15 that is carried by the header and is positioned to engage and cut standing crops. The header also has two upright end or side panels 16, 16 and a center conveyor 17 that may be constituted as a canvas or draper mounted on suitable rollers 18, 18 to form an endless conveyor belt. The conveyor runs from immediately behind the cutter bar 15 upwardly toward a feed roller 20 that in turn takes material from the conveyor and feeds it toward a chopping cylinder (not shown). The conveyor 17 runs upwardly, as stated previously, and is narrower than the cutter bar 15. A pair of floor panels 21, 21 extend from the end panels 16, 16 to the edges of the conveyor 17. The floor panels 21, 21 are flat and extend substantially co-planar to upper surfaces of the conveyor for a distance behind the cutter bar. Transition side pieces 22, 22 are positioned intermediately between the cutter bar 15 and the feed roller 20 and provide tapered surfaces to attempt to permit a smooth transition from the end panels 16 to the conveyor at the upper and rearward portion of the header.

A reel assembly 23 includes a plurality of reel bats 24, three as shown, that are fixedly attached to a shaft 25 which in turn is suitably rotatably mounted on bearings 26, 26 that are mounted on provided support arms 27, 27 that in turn are attached to the header. The reel shaft 25 is driven by a sprocket 30 and a chain 31 that in turn is connected to a sprocket 32 driven from the main power shaft 14.

The reel bats 24 each include a plurality of reel arms 33 fixedly attached with respect to the reel shaft 25. An outer blade 34 is bolted to each of the aligning arms and a separate panel 35 made of expanded metal or similar material is attached to the arms and extends from the blade 34 of each bat down to the shaft 25. Thus no material that is being cut can get in between the blades 34 and the shaft 25 to wrap or in any other way jam the mechanism.

The feeder attachment made according to the present invention includes an elongated tubular transverse feeder shaft 36 that is rotatably mounted on its drive end on a suitable bushing 37 that is held on a reinforcing strip 40 that is mounted to one of the end panels 16 of the header. The other end of the tubular shaft 36 is rotatably mounted on a stub shaft 38 that is fixedly attached on a second reinforcing strip 50 which is mounted on a second of the end panels 16. The shaft 36 has a pair of auger flight sections 41, 41, one fixedly attached to the shaft next adjacent each of the end panels 16 of the header. The auger flight sections are of opposite lead or hand and each extends from its associated end panel 16 to the corresponding outer edge of the conveyor 17. One of a pair of auger stripper members 39 is fixedly attached to each side of the header and is associated with its corresponding auger sections. The portion of the shaft 36 between the auger sections has a pair of beater blades 42, 42 bolted thereto. The shaft 36 is mounted next adjacent the cutter bar and above it. The beater blades 42, 42 are positioned to clear the conveyor 17 so there is no interference therewith.

The transverse feeder shaft 36 is mounted behind the cutter bar, and directly in front of the conveyor and flat floor panels, the shaft is positioned above the cutter bar and above the forward ends of the conveyor and floor panels. The shaft 36 is mounted adjacent the intersection of the cutter bar and the floor panels. In this way the augers engage the cut material as soon as it comes from the cutter bar in order to accomplish the feeding of the material toward the conveyor and upwardly into the machine.

The shaft 36 is driven by a drive pulley 43 that is mounted on a jack shaft 44 that in turn is rotatably mounted underneath the header. The pulley 43 is a flat pulley that is lagged with suitable friction material and is positioned to engage the back side of a drive V-belt 45 that may be used to drive a sickle 46 in the cutter bar 15. As the drive pulley 43 does not positively engage the belt 45 the pulley will slip when the load that it is driving becomes too heavy.

The jack shaft 44 extends underneath the header as stated previously and a second pulley 47 is drivably mounted thereon. A belt 48 drivably engages the second pulley and extends down to a driven pulley 49 that is drivably mounted onto the shaft 36. Thus whenever the sickle drive belt is running the shaft 36 will be powered. If some portion of the machine plugs so material builds up on the cutter bar the pulley 43 will slip and the shaft 36 will stop. This prevents winding and wrapping of cut material on the shaft.

If the material being cut is especially heavy or long, it will be desirable to put in auxiliary augers for conveying the heads or upper portions of the cut material toward the conveyor 17. As best shown in FIG. 1 these conveyors may be constituted as stub auger sections 52, 52 that are rotatably mounted on the end panels 16. The stub auger sections extend through the end panels 16 of the header at an intermediate position between the cutter bar and the upper end of the header. Each stub auger section terminates short of its corresponding edge of the conveyor 17. The stub auger sections have flights 53, 53 of opposite hand or lead. These auger sections rotate in direction as indicated by arrows 54, 54 at a speed greater than the rotational speed of the lower shaft 36. Thus the portions of the cut material that strike these augers are moved inwardly toward the conveyor more quickly than the butt portions down by the cutter bar.

The short auger sections are independently driven from sheaves mounted on opposite ends of the jack shaft 44 and each is driven by a belt 55 drivably connected to a stub drive sheave 56.

*Operation*

When the field chopper is to be used, it is attached to a suitable power source and is pulled forwardly through a field of corn or other similar standing crop that is to be cut and processed. Choppers of this type have found particular usefulness in cutting corn that has been seeded with an ordinary grain drill. This corn is not cultivated in rows but is growing like seeded grain. Thus it is practically impossible to use a row crop attachment on the chopper so a sickle type cutter bar must be employed.

As the chopper is pulled forward through the field, the reel assembly 23 will rotate in direction as indicated by arrow 57. The corn stalks, represented at 58 are hit by the reel and moved rearwardly with respect to the machine at the same time that the sickle 46 acts to cut the material. When this happens, the reel continues to move the cut corn stalks rearwardly. The corn stalks that are in line with the floor panels 21 of the header will not be immediately acted upon by the conveyor 17 but must be moved inwardly toward the conveyor in order to be carried to the chopping cylinder. These loose corn stalks engage the auger flights 41 attached to the shaft 36. The auger is rotating in direction as indicated by arrows 59 and the butts of the stalks are moved inwardly toward the conveyor by this augering action. It should be noted that the auger flights are rotating in direction to tend to feed the material over the top of the auger. The stripper members 39 prevent the cut stalk from being carried around by the augers so there is no wrapping. Also as the auger flights strike the material that has been cut they tend to move the material upwardly as well as inwardly. When the cut material from the outer portions of the header has reached the conveyor, the beater blades 42 will strike this outer cut material as well as the material that is cut directly in front of the beater blade and will throw the cut material upwardly along the conveyor. The beater blade action in addition to the normal conveying force of the conveyor will insure that the material is carried upwardly and is properly fed into the chopping cylinder of the machine.

The material that is cut and falls directly on the conveyor 17 is hit by the beater blades 42 immediately after being cut and will thus be helped up the conveyor to insure that the conveyor will handle the material without plugging.

When the stub auger sections 52 are used the heads or upper portions of the cut corn fall onto the stub augers 52. The augers are rotating in direction as indicated by arrows 54 at a speed greater than the speed of rotation of shaft 36. As the heads hit the auger flights 53 they are moved inwardly more rapidly than the butts are being moved inwardly by the auger flights 41 on shaft 36. Thus when the heads drop off the flights and down onto the conveyor 17 the entire cut corn stalk will be carried upwardly toward the feed roller 20 and is fed into the chopping cylinder to be chopped.

It has been found that in heavy crop conditions the chopping cylinder sometimes will not be able to handle all the material that is being cut. When this happens the cut material builds up on the conveyor and platform. The extra load on the augers and beater caused by this build up will cause the flat drive pulley 43 to slip and the feed augers will stop. This prevents the material from wrapping around the augers when it can no longer be moved away by the conveyor. When the conveyor again starts to carry the material away the load on the feed augers will be reduced and they will again be driven by the pulley 43.

The reel assembly 23 is constructed to prevent the heavy corn stalks from causing damage thereto. The mesh panels, extending from the blades 34 to the shaft 25, prevent any of the corn stalks from being entangled in the reel bats or reel arms. If the cut corn stalks become entangled they will wrap around the reel and the machine will have to be stopped to be cleaned out.

While the specific application illustrated here is in connection with a field forage harvester or chopper it is to be understood that this feeding attachment can be used on any type of machine employing a cutter bar where the material has to be moved from a relatively wide cutter bar onto a relatively narrow conveyor.

What is claimed is:

1. The combination with a machine adapted to be pulled through a field of standing crop material, said machine including a forwardly disposed header having spaced upright end panels, a centrally disposed draper type conveyor adapted to move material rearwardly and upwardly parallel to the direction of travel of said machine, substantially flat upwardly inclined front floor panels extending between said upright end panels and the outer edges of the conveyor, a forwardly disposed cutter bar extending between said upright end panels immediately in front of said conveyor and attached to forward portions of said upwardly inclined front floor panels and extending forwardly therefrom, said cutter bar extending at substantially right angles to the direction of travel of said machine and being positioned so that the plane of cut thereof is substantially parallel to the ground and a pair of transition panels converging from said end panels to said conveyor and extending rearwardly and upwardly from said flat floor panels, each of said transition panels being joined to one said floor panels, of: a feeding attachment including an elongated shaft rotatably mounted between said end panels on an axis substantially parallel to said cutter bar and positioned immediately forwardly of the front end portions of said conveyor and floor panels and immediately rearwardly of said cutter bar and above each of them adjacent the intersection between said cutter bar and said floor panels, a pair of auger sections of opposite hand fixedly attached to said shaft, each of said auger sections being positioned to extend from position adjacent one of said end panels of said header to position substantially aligned with the adjacent corresponding edge of said conveyor, a pair of beater blades fixedly attached to center portions of said elongated shaft and aligned with said conveyor, and means to rotate the elongated shaft in direction to cause the auger sections to tend to move the lower portions of material cut by said cutter bar upwardly over said auger sections and inwardly toward said conveyor.

2. The combination as specified in claim 1 and a pair of stub auger sections each rotatably mounted with respect to one of said end panels of said header and each spaced upwardly and rearwardly from said elongated shaft adjacent said transition panels, said stub auger sections extending from said end panels toward said conveyor and terminating short of a vertical plane aligned with the corresponding side of said conveyor, and means for rotating said augers faster than said elongated shaft.

3. The combination as specified in claim 2 and a separate auger stripper member fixedly attached with respect to said floor panel and operably associated with each of said auger sections on said elongated shaft.

References Cited in the file of this patent
UNITED STATES PATENTS

| | | |
|---|---|---|
| 2,292,958 | Millard et al. | Aug. 11, 1942 |
| 2,455,905 | Ronning et al. | Dec. 7, 1948 |
| 2,513,966 | Pool et al. | July 4, 1950 |
| 2,755,912 | Ashton | July 24, 1956 |
| 2,895,590 | Snow | July 21, 1959 |